United States Patent
Satake et al.

(10) Patent No.: US 9,346,366 B2
(45) Date of Patent: May 24, 2016

(54) CHARGE/DISCHARGE SYSTEM

(71) Applicants: Toshihide Satake, Chiyoda-ku (JP);
Takanori Matsunaga, Chiyoda-ku (JP);
Yoichi Okubo, Chiyoda-ku (JP)

(72) Inventors: Toshihide Satake, Chiyoda-ku (JP);
Takanori Matsunaga, Chiyoda-ku (JP);
Yoichi Okubo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 452 days.

(21) Appl. No.: 13/747,983

(22) Filed: Jan. 23, 2013

(65) Prior Publication Data

US 2014/0062398 A1 Mar. 6, 2014

(30) Foreign Application Priority Data

Aug. 29, 2012 (JP) .................................. 2012-188483

(51) Int. Cl.
*H02J 7/00* (2006.01)
*B60L 11/18* (2006.01)
*B60L 3/00* (2006.01)

(52) U.S. Cl.
CPC ........... *B60L 11/1809* (2013.01); *B60L 3/0046* (2013.01); *B60L 11/184* (2013.01); *B60L 11/1816* (2013.01); *B60L 11/1842* (2013.01); *B60L 11/1844* (2013.01); *B60L 11/1846* (2013.01); *B60L 11/1859* (2013.01); *B60L 11/1861* (2013.01); *B60L 2240/545* (2013.01); *Y02E 60/721* (2013.01); *Y02T 10/7005* (2013.01); *Y02T 10/705* (2013.01); *Y02T 10/7044* (2013.01); *Y02T 10/92* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
USPC .......................................... 320/109; 439/304
See application file for complete search history.

(56) References Cited

U.S. PATENT DOCUMENTS 6,321,530 B1 * 11/2001 Hoshi et al. ..................... 60/274
2006/0005738 A1 * 1/2006 Kumar ............................ 105/35

(Continued)

FOREIGN PATENT DOCUMENTS

CN 1652426 A 8/2005
DE 10 2009 036 943 A1 3/2011

(Continued)

OTHER PUBLICATIONS

German Office Action, issued May 2, 2014, Application No. 10 2013 204 214.0.

(Continued)

*Primary Examiner* — Brian Ngo
(74) *Attorney, Agent, or Firm* — Sughrue Mion, PLLC; Richard C. Turner (57) ABSTRACT

A charge/discharge system is mounted on an electric vehicle using a motor as a driving source, which is driven by electric power charged in a battery, and controls at least one of charge from the outside of the vehicle to the battery and discharge from the battery to the outside of the vehicle. The charge/discharge system comprises a power supply unit for controlling power supply to supply power only to a unit contributing charge/discharge among units connected to a wiring system of driving power for the motor when charge/discharge to/from the battery from/to the outside of the vehicle is performed.

6 Claims, 9 Drawing Sheets

(56) References Cited

U.S. PATENT DOCUMENTS

| | | |
|---|---|---|
| 2011/0210698 A1 | 9/2011 | Sakai |
| 2012/0071017 A1 | 3/2012 | Gaul et al. |
| 2012/0242288 A1 | 9/2012 | Birke et al. |
| 2012/0299377 A1 | 11/2012 | Masuda et al. |

FOREIGN PATENT DOCUMENTS

| | | |
|---|---|---|
| DE | 10 2009 016 504 A1 | 4/2011 |
| EP | 1684397 A2 | 7/2006 |
| JP | 09-284913 A | 10/1997 |
| JP | 10-322809 A | 12/1998 |
| JP | 11-220808 A | 8/1999 |
| JP | 2009-071900 A | 4/2009 |
| JP | 2010-238576 A | 10/2010 |
| JP | 2011-182518 A | 9/2011 |
| JP | 2012-085383 A | 4/2012 |
| JP | 2012-085432 A | 4/2012 |
| JP | 2012-085481 A | 4/2012 |
| WO | 2011-099116 A1 | 8/2011 |

OTHER PUBLICATIONS

Japanese Office Action (Decision of Refusal), dated Feb. 12, 2014, Patent Application No. 2012-188483.

Japanese Office Action (Notification of Reason(s) for Refusal), dated Dec. 10, 2013, Patent Application No. 2012-188483.

Communication dated Apr. 22, 2015, issued by the State Intellectual Property Office of the People's Republic of China in counterpart Application No. 201310086858.X.

Communication dated Jan. 13, 2016, from the State Intellectual Property Office of People's Republic of China in counterpart Application No. 201310086858.X.

* cited by examiner

FIG. 9

CHARGE/DISCHARGE SYSTEM

BACKGROUND OF THE INVENTION

1. Field of the Invention

The present invention relates to a charge/discharge system, and more particularly to a charge/discharge system for a battery of an electric vehicle.

2. Description of the Background Art

In recent years, the development of a next-generation power network called "Smart Grid" has attracted attention. One purpose of the Smart Grid is to optimize the supply and demand of power, and as shown in Japanese Patent Application Laid Open Gazette No. 2012-85383, it is proposed that a battery of an electric vehicle should be used as a buffer for reducing the peak of household electric power demand.

By charging the battery of the electric vehicle during a time period of low electric power demand and discharging the battery of the electric vehicle at the peak of electric power demand, for example, it is possible to reduce the peak of electric power demand. Further, since the electric power cost is generally low during the time period of low electric power demand, when the electric power charged during the time period is used during a time period where the electric power cost is high, it is possible to reduce household electricity rates. Furthermore, in emergency situations such as power outages or the like, by discharging the battery of the electric vehicle, it can be used as a power supply in such emergency situations.

Japanese Patent Application Laid Open Gazette Nos. 2012-85432 and 2011-182518 disclose exemplary constitutions of conventional electric vehicles. In each of these electric vehicles, to a high voltage wiring system, connected are a vehicle driving battery, a high-voltage equipment (a drive motor control device or a car charger), a high voltage relay, and the like. This is configured to supply power to all equipments relevant to the high voltage wiring system when a charge/discharge gun is connected to the vehicle.

The electric vehicles include an electric car which gains power by driving a motor using electric power charged in a secondary battery (storage battery) (hereinafter, referred to simply as "battery") as a driving source, a plug-in hybrid electric vehicle (PHEV) which uses both an engine and a motor, and the like.

In the above-discussed conventional electric vehicles, since it is not assumed that the electric vehicle is connected to the smart grid and charge/discharge is performed for a long time and it is configured to turn on the power supplies of all the equipments relevant to a high voltage wiring system when a charge/discharge gun is connected to the vehicle, even the power supplies of the equipments irrelevant to charge/discharge, such as a drive motor control device or the like, are kept in an ON state for a long time when the electric vehicle is connected to the smart grid. This arises problems of wasting the electric power and accelerating degradation of parts.

SUMMARY OF THE INVENTION

It is an object of the present invention to provide a charge/discharge system capable of reducing power consumption and suppressing degradation of parts even when the system is connected to a smart grid for a long time.

The present invention is intended for a charge/discharge system. According to the present invention, the charge/discharge system is mounted on an electric vehicle using a motor as a driving source, which is driven by electric power charged in a battery, and controls at least one of charge from the outside of the vehicle to the battery and discharge from the battery to the outside of the vehicle, and the charge/discharge system includes a power supply unit for controlling power supply to supply power only to a unit contributing charge/discharge among units connected to a wiring system of driving power for the motor when charge/discharge to/from the battery from/to the outside of the vehicle is performed.

Since the charge/discharge system of the present invention includes the power supply unit for controlling power supply to supply power only to a unit contributing charge/discharge when charge/discharge to/from the battery from/to the outside of the vehicle is performed, it is possible to reduce power consumption and suppress degradation of parts even when the system is connected to a smart grid for a long time.

These and other objects, features, aspects and advantages of the present invention will become more apparent from the following detailed description of the present invention when taken in conjunction with the accompanying drawings.

DESCRIPTION OF THE PREFERRED EMBODIMENTS

The Preferred Embodiment

<Constitution of Apparatus>

Figure 1:
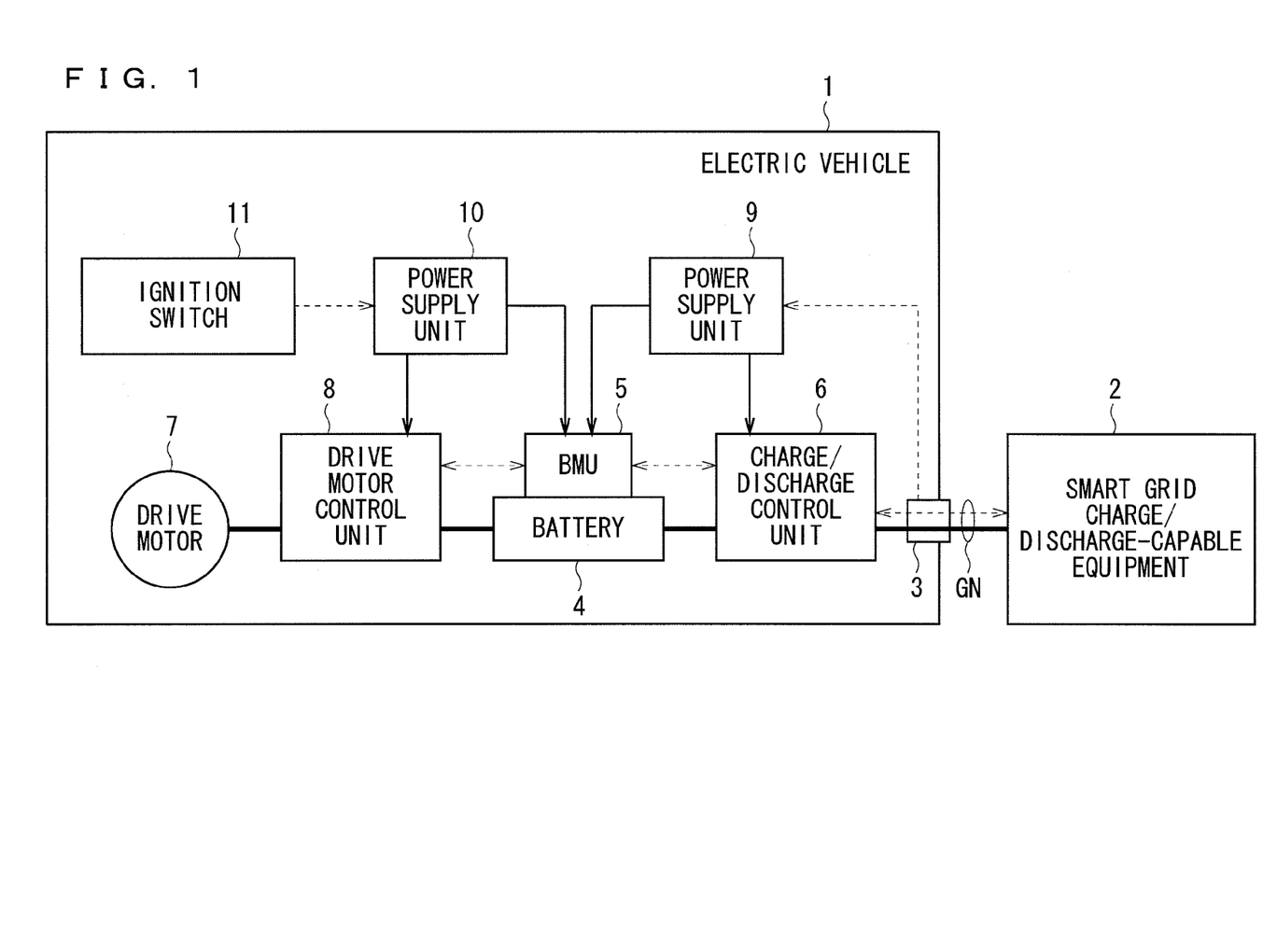
FIG. 1 is a block diagram showing a constitution of an electric vehicle 1 comprising a charge/discharge system in accordance with a preferred embodiment of the present invention.

FIG. 1 is a block diagram showing a constitution of an electric vehicle 1 comprising a charge/discharge system in accordance with a preferred embodiment of the present invention.

As shown in FIG. 1, the electric vehicle 1 is configured to give and receive electric power through a charge/discharge gun GN to/from a smart grid charge/discharge-capable equipment 2 which is provided outside of the vehicle. The smart grid charge/discharge-capable equipment 2 includes a charging station provided in public facilities and plants and a connection equipment for smart grid provided at home.

The smart grid charge/discharge-capable equipment 2 and the electric vehicle 1 are electrically connected with the charge/discharge gun GN. The charge/discharge gun GN is a dedicated cable for charge/discharge, which has a high voltage wire used for giving and receiving electric power between the smart grid charge/discharge-capable equipment 2 and the electric vehicle 1 and a signal line used for giving and receiving signals between the smart grid charge/discharge-capable equipment 2 and the electric vehicle 1. In FIG. 1 and the following block diagrams, the high voltage wires in a wiring system for delivering driving power for a motor are indicated by thick solid lines, power supply lines of the equipments are indicated by thin solid lines, and signal lines are indicated by broken lines.

The electric vehicle 1 comprises a drive motor 7 serving as a power source for the electric vehicle 1, a battery 4 serving as a power source for the drive motor 7, a drive motor control unit 8 for controlling electric power to be given to the drive motor 7 to thereby control the drive motor 7, a battery management unit (BMU) 5 for monitoring conditions of the battery 4, such as the amount of electric power stored therein, the temperature thereof, and the like, a charge/discharge control unit 6 for controlling charge from the smart grid charge/discharge-capable equipment 2 to the battery 4 and discharge from the battery 4 to the smart grid charge/discharge-capable equipment 2, a power supply unit 9 (first power supply unit) for supplying power to the BMU 5 and the charge/discharge control unit 6, and a power supply unit 10 (second power supply unit) for supplying power to the BMU 5 and the drive motor control unit 8. In order to cause the electric vehicle 1 to run, an ignition signal is given to the power supply unit 10 from an ignition switch 11 which is operated by a driver. When the charge/discharge gun GN is connected to the vehicle connection unit 3, a connection signal outputted from the vehicle connection unit 3 is given to the power supply unit 9. The above-described constituent elements are those relevant to the present invention and other constituent elements which are very little relevant or irrelevant to the present invention are herein omitted.

<Operation of Apparatus>

Next, discussion will be made on an operation of the charge/discharge system in accordance with the preferred embodiment of the present invention. First, with reference to the flowchart of FIG. 2, discussion will be made on an operation of the charge/discharge system during charging and discharging.

Figure 2:
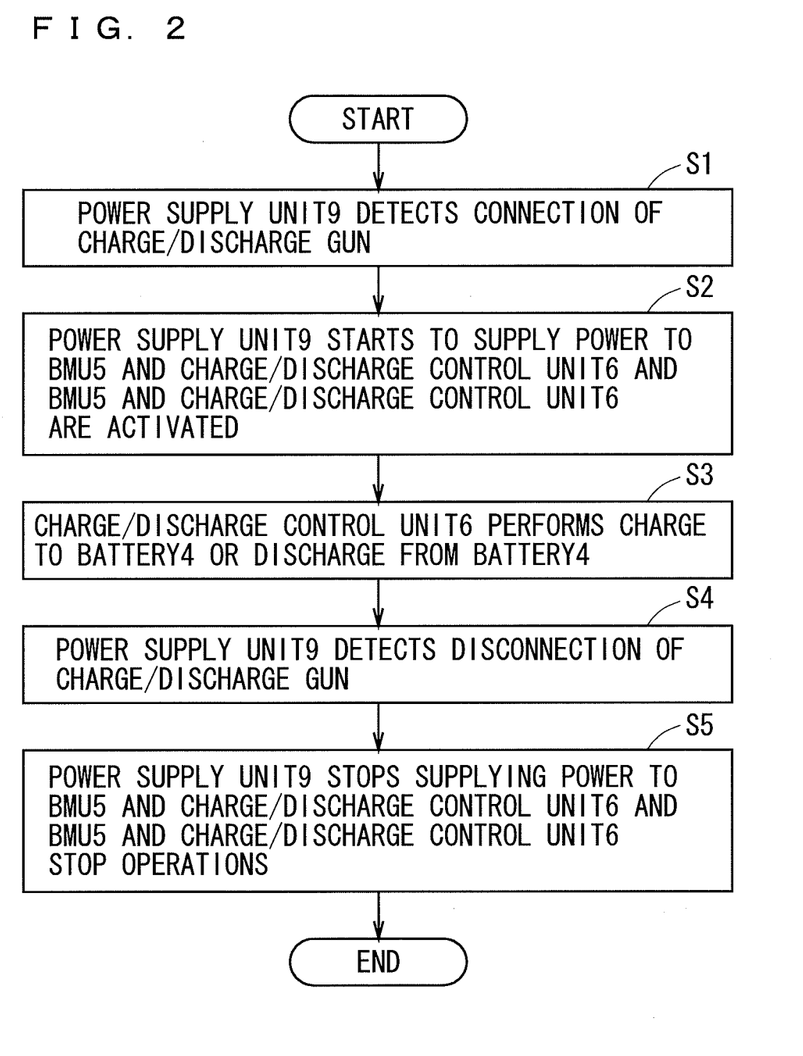
FIG. 2 is a flowchart for explanation of an operation of the charge/discharge system during charging and discharging in accordance with the preferred embodiment of the present invention.

In order to perform charge/discharge to/from the battery 4, the charge/discharge gun GN attached to the smart grid charge/discharge-capable equipment 2 is connected to the vehicle connection unit 3, and when the charge/discharge gun GN is connected to the vehicle connection unit 3, the power supply unit 9 detects the connection of the charge/discharge gun GN (Step S1). Specifically, when the charge/discharge gun GN is connected to the vehicle connection unit 3, the connection signal outputted from the vehicle connection unit 3 is given to the power supply unit 9 and the power supply unit 9 detects the connection signal.

Then, when the power supply unit 9 detects the connection of the charge/discharge gun GN, with the detection as a trigger, the power supply unit 9 starts to supply power (generally, 12 to 14V) to the BMU 5 and the charge/discharge control unit 6, and the BMU 5 and the charge/discharge control unit 6 are thereby activated (Step S2). Since the power supply is started with the detection of the charge/discharge gun GN being connected as a trigger, it is possible to relatively simply control the power supply.

The charge/discharge control unit 6 receives an instruction on charge/discharge from the smart grid charge/discharge-capable equipment 2 through a signal line and controls charge to the battery 4 or discharge from the battery 4 on the basis of information on the conditions of the battery 4 which is given by the BMU 5 (Step S3).

Herein, the information on the conditions of the battery 4 which is given by the BMU 5 indicates, for example, the current amount of electric power stored in the battery 4 and the voltage thereof, and when the respective values thereof exceed predetermined values, a control is performed not to perform charge so as to prevent overcharge or to reduce charging current. On the other hand, when the current amount of electric power stored in the battery 4 and the voltage thereof are lower than predetermined values, a control is performed not to perform discharge so as to prevent overdischarge.

Further, the information on the conditions of the battery 4 includes the temperature of the battery 4, and when the current temperature thereof is higher than a predetermined value, a control is performed not to perform charge so as to prevent overheat or to reduce charging current. The above-discussed information on "the amount of electric power stored in the battery 4", "the voltage of the battery 4", and "the temperature of the battery 4" is periodically sent from the BMU 5 to the charge/discharge control unit 6.

When the charge/discharge to/from the battery 4 is completed and the charge/discharge gun GN is disconnected from the vehicle connection unit 3, the power supply unit 9 detects that the charge/discharge gun GN is disconnected (Step S4). Specifically, when the charge/discharge gun GN is disconnected from the vehicle connection unit 3, the connection signal outputted from the vehicle connection unit 3 is stopped being supplied and the power supply unit 9 detects that supply of the connection signal is stopped.

Then, when the power supply unit 9 detects the disconnection of the charge/discharge gun GN, the power supply unit 9 stops supplying power to the BMU 5 and the charge/discharge control unit 6, and the operations of the BMU 5 and the charge/discharge control unit 6 are finished (Step S5).

Figure 3:
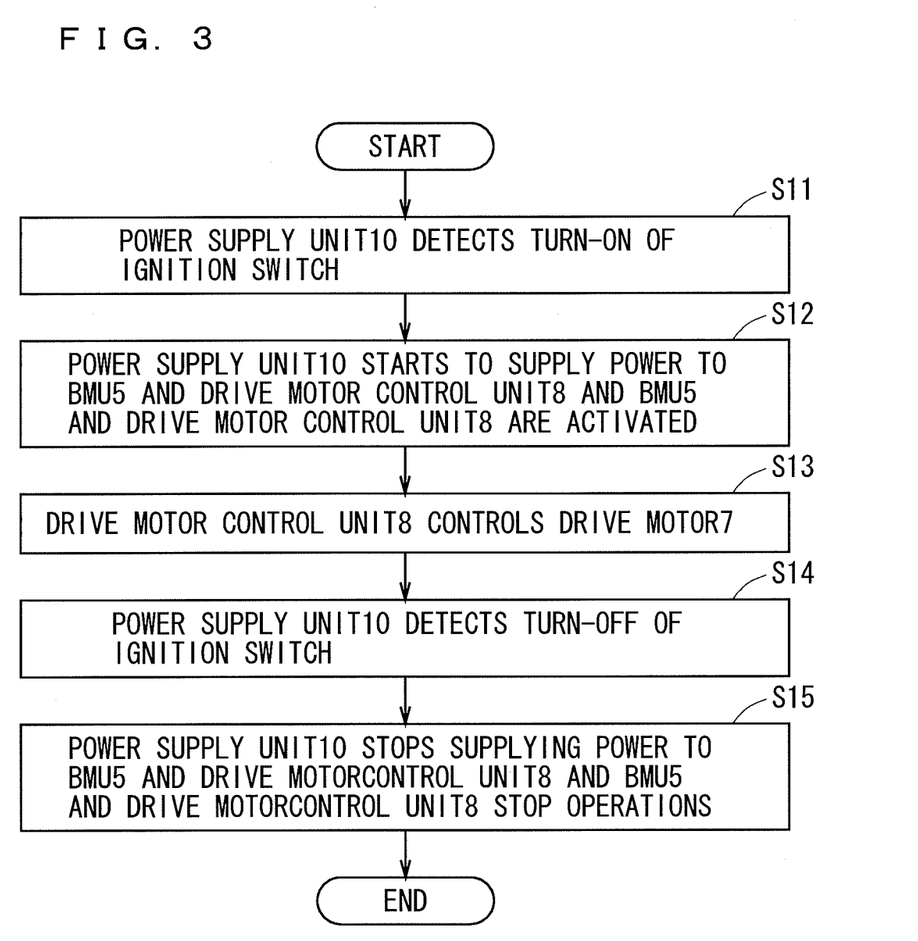
FIG. 3 is a flowchart for explanation of an operation of the charge/discharge system during running in accordance with the preferred embodiment of the present invention.

Next, with reference to the flowchart of FIG. 3, discussion will be made on an operation of the charge/discharge system during running. In order to cause the electric vehicle 1 to start running, the driver turns on the ignition switch 11, and then the power supply unit 10 detects the turn-on of the ignition switch 11 (Step S11). Specifically, when the ignition switch 11 is turned on, the ignition signal is outputted and the power supply unit 10 detects the ignition signal.

Then, when the power supply unit 10 detects the turn-on of the ignition switch 11, with the detection as a trigger, the power supply unit 10 starts to supply power to the BMU 5 and the drive motor control unit 8, and the BMU 5 and the drive motor control unit 8 are thereby activated (Step S12). The ignition switch 11 has an OFF position where an ignition key is inserted and extracted, an accessory position where accessory equipments such as a car audio and the like are operated, a start position where the drive motor is activated, and the like, and the turn-on of the ignition switch 11 in the present preferred embodiment refers to a state in which the ignition switch 11 is turned to the start position where the drive motor is activated.

The drive motor control unit 8 controls the drive motor 7 on the basis of driver's operations of an accelerator (not shown) and a brake pedal (not shown) and the information on the conditions of the battery which is received from the BMU 5. With the control over the drive motor 7, the electric vehicle 1 runs (Step S13).

When the driver turns off the ignition switch 11 in order to cause the electric vehicle 1 to stop running, the power supply unit 10 detects the turn-off of the ignition switch 11 (Step S14). Specifically, when the ignition switch 11 is turned off, an OFF signal is given to the power supply unit 10 and the power supply unit 10 detects the OFF signal.

Then, when the power supply unit 10 detects the turn-off of the ignition switch 11, the power supply unit 10 stops supplying power to the BMU 5 and the drive motor control unit 8, and the operations of the BMU 5 and the drive motor control unit 8 are finished (Step S15).

Thus, in the charge/discharge system of the preferred embodiment of the present invention, since the electric power is supplied only to the portion from the smart grid charge/discharge-capable equipment 2 outside the vehicle to the battery 4, which is relevant to charge/discharge, and not supplied to the drive motor control unit 8 during charging and discharging, it is possible to prevent power consumption by the drive motor control unit 8 and also prevent degradation of parts of the drive motor control unit 8 from being accelerated.

<The First Variation>

Though the configuration where no high voltage relay is provided in the high voltage wiring system has been discussed in the above-discussed preferred embodiment, there may be a configuration where a high voltage relay is arranged at an appropriate position and the charge/discharge control unit 6, the drive motor control unit 8, and the like control ON/OFF of the high voltage relay.

Figure 4:
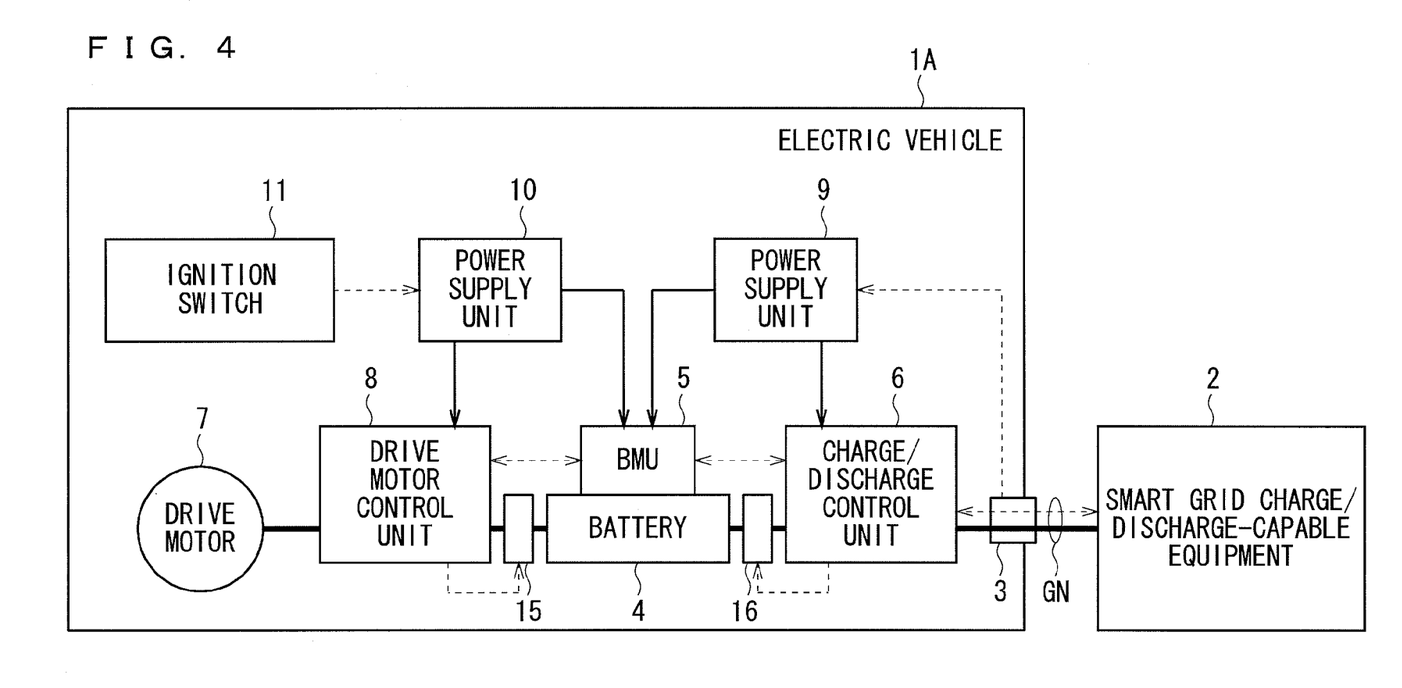
FIG. 4 is a block diagram showing an exemplary charge/discharge system in which a high voltage relay is provided in a high voltage wiring system.

FIG. 4 is a block diagram showing an exemplary charge/discharge system in which a high voltage relay is provided in the high voltage wiring system. As shown in FIG. 4, an electric vehicle 1A has a configuration where a high voltage relay 15 is inserted in a high voltage wire between the drive motor control unit 8 and the battery 4 and a high voltage relay 16 is inserted in a high voltage wire between the battery 4 and the charge/discharge control unit 6. Constituent elements identical to those in the electric vehicle 1 shown in FIG. 1 are represented by the same reference signs and redundant discussion will be omitted.

With this configuration, when some abnormality occurs in the charge/discharge control unit 6, for example, the charge/discharge control unit 6 turns off the high voltage relay 16 to thereby electrically disconnect the battery 4 and the charge/discharge control unit 6, and it is therefore possible to protect the battery 4 and the charge/discharge control unit 6.

Further, when some abnormality occurs in the drive motor control unit 8, the drive motor control unit 8 turns off the high voltage relay 15 to thereby electrically disconnect the battery 4 and the drive motor control unit 8, and it is therefore possible to protect the battery 4 and the drive motor control unit 8.

<The Second Variation>

Though the configuration where the two power supply units 9 and 10 are used to change the power supply targets between during charging and discharging and during running has been discussed in the above-discussed preferred embodiment, there may be a configuration where only one power supply unit is used to change the power supply targets in accordance with the ignition signal and the connection signal of the charge/discharge gun GN.

Figure 5:
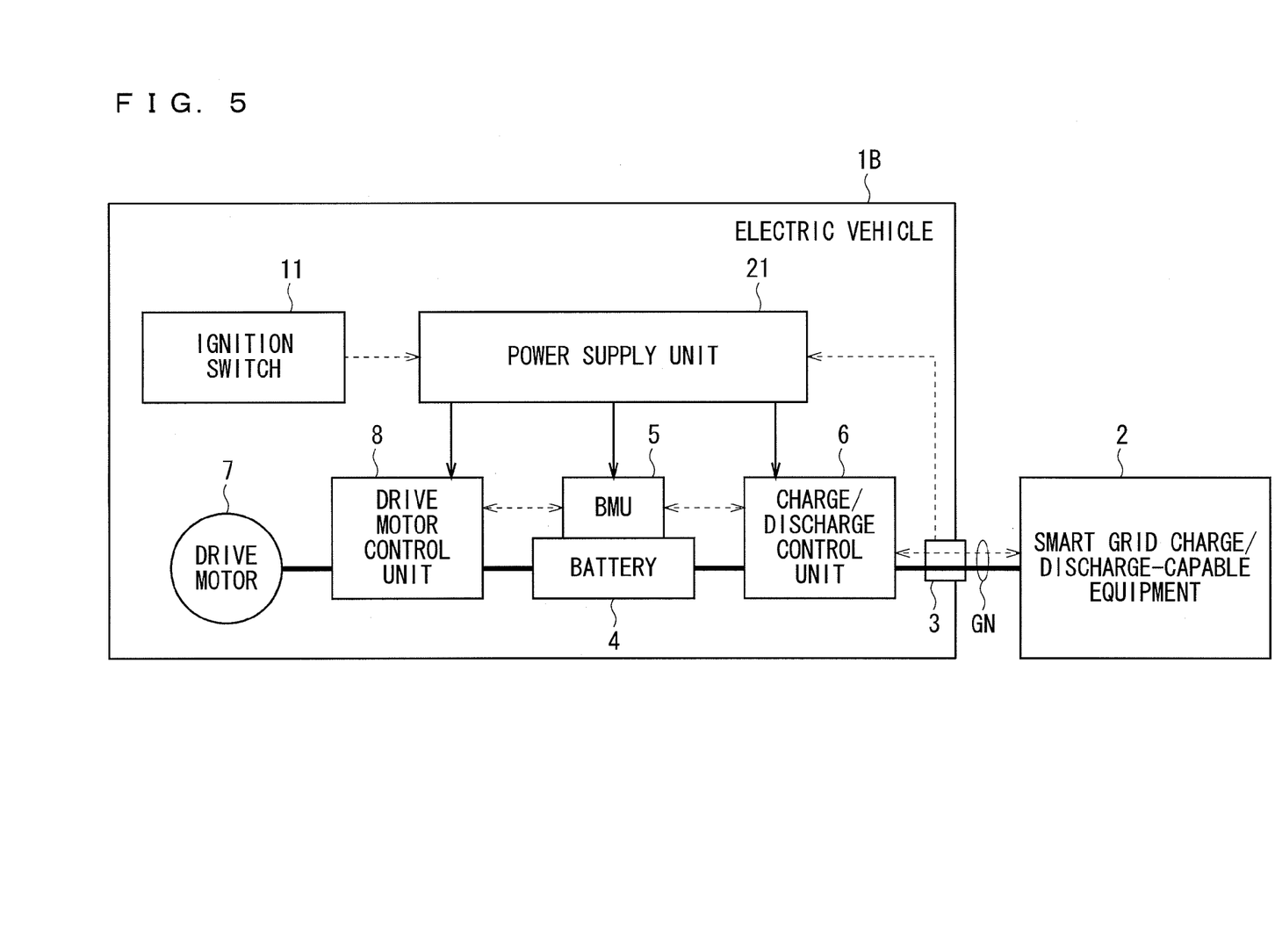
FIG. 5 is a block diagram showing an exemplary charge/discharge system comprising only one power supply unit.

FIG. 5 is a block diagram showing an exemplary charge/discharge system comprising only one power supply unit. As shown in FIG. 5, an electric vehicle 1B has a configuration where a power supply unit 21 supplies power to the BMU 5, the charge/discharge control unit 6, and the drive motor control unit 8 and the power supply unit 21 determines a power supply target and distributes the power supply.

To the power supply unit 21, given are the ignition signal from the ignition switch 11 and the connection signal which is outputted from the vehicle connection unit 3 when the charge/discharge gun GN is connected to the vehicle connection unit 3.

With this configuration, it is possible to reduce the number of power supply units and suppress an increase in the manufacturing cost.

Figure 6:
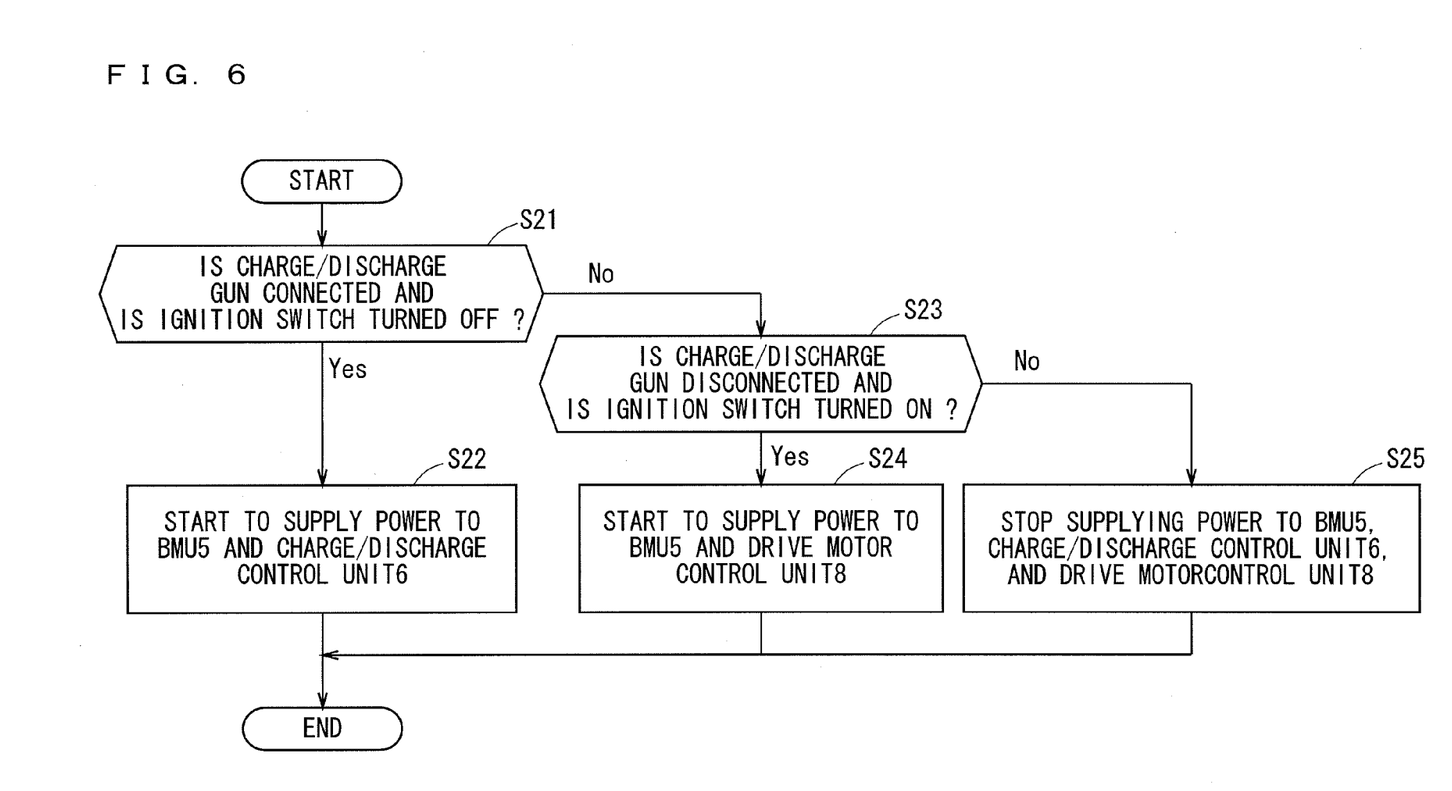
FIG. 6 is a flowchart for explanation of an operation of the power supply unit for changing a power supply target.

Hereinafter, with reference to the flowchart of FIG. 6, discussion will be made on an operation of the power supply unit 21 for changing the power supply target.

The power supply unit 21 regularly checks whether or not a connection signal of the charge/discharge gun GN is outputted from the vehicle connection unit 3 and whether or not an ignition signal is outputted from the ignition switch 11 (Step S21). When it is determined that the charge/discharge gun GN is connected to the vehicle connection unit 3 and the ignition switch 11 is in an OFF state (no ignition signal is given), the power supply unit 21 starts to supply power to the BMU 5 and the charge/discharge control unit 6 (Step S22).

On the other hand, when it is determined that the charge/discharge gun GN is connected to the vehicle connection unit 3 and the ignition switch 11 is not in the OFF state in Step S21, the process goes to Step S23.

When it is determined that the charge/discharge gun GN is not connected to the vehicle connection unit 3 and the ignition switch 11 is in an ON state (the ignition signal is given) in Step S23, the power supply unit 21 starts to supply power to the BMU 5 and the drive motor control unit 8 (Step S24).

On the other hand, when it is determined that the charge/discharge gun GN is not connected to the vehicle connection unit 3 and the ignition switch 11 is not in the ON state in Step S23, the process goes to Step S25 and the power supply unit 21 stops supplying power to the BMU 5, the charge/discharge control unit 6, and the drive motor control unit 8.

In this case, there are two possible cases where the charge/discharge gun GN is connected to the vehicle connection unit 3 and the ignition switch 11 is in the ON state and where the charge/discharge gun GN is not connected to the vehicle connection unit 3 and the ignition switch 11 is in the OFF state. In the former case, the power supply to all the portions is stopped in order to prevent the electric vehicle from running while the electric vehicle is connected to the smart grid charge/discharge-capable equipment 2. In the latter case, the power supply to all the portions is stopped, assuming that no charge/discharge from/to the smart grid charge/discharge-capable equipment 2 is to be performed and the electric vehicle is not to run.

<The Third Variation>

Though the case where the power supply unit 10 performs the control (first control) to start supplying power to the BMU 5 and the drive motor control unit 8 with the detection of the ignition switch 11 being turned on as a trigger has been discussed in the above-discussed preferred embodiment, there may be a case where the power supply unit 10 performs another control (second control) to stop supplying power to the drive motor control unit 8 when the charge/discharge gun GN is connected and the ignition switch 11 is turned on, and performs still another control (third control) to stop supplying power to the charge/discharge control unit 6 when the power is supplied to the drive motor control unit 8 and the charge/discharge gun GN is connected.

Figure 7:
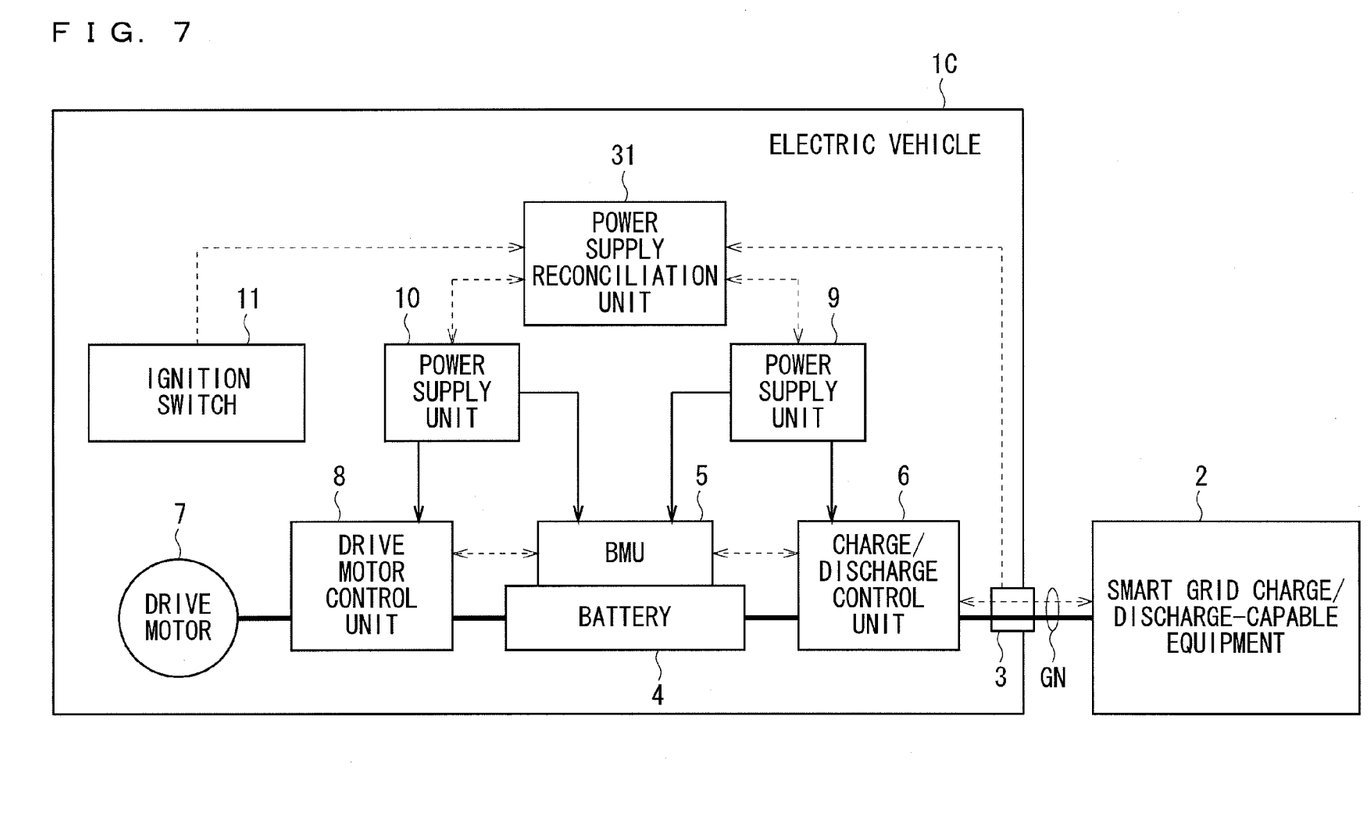
FIG. 7 is a block diagram showing an exemplary charge/discharge system comprising a unit for reconciling the power supply units.

FIG. 7 is a block diagram showing an exemplary charge/discharge system comprising a unit for reconciling the power supply units 9 and 10. As shown in FIG. 7, an electric vehicle 1C further comprises a power supply reconciliation unit 31 for reconciling the power supply units 9 and 10, and to the power supply reconciliation unit 31, given are the ignition signal from the ignition switch 11 and the connection signal from the vehicle connection unit 3. Further, the power supply reconciliation unit 31 gives a control signal to the power supply units 9 and 10 and receives signals indicating respective operating states from the power supply units 9 and 10.

With this configuration, since the power supply to the drive motor control unit 8 is stopped when the charge/discharge gun GN is connected and the ignition switch 11 is turned on, and the power supply to the charge/discharge control unit 6 is stopped when the electric power is supplied to the drive motor control unit 8 and the charge/discharge gun GN is connected, it is possible to prevent the electric vehicle from running while being connected to the smart grid charge/discharge-capable equipment 2.

Figure 8:
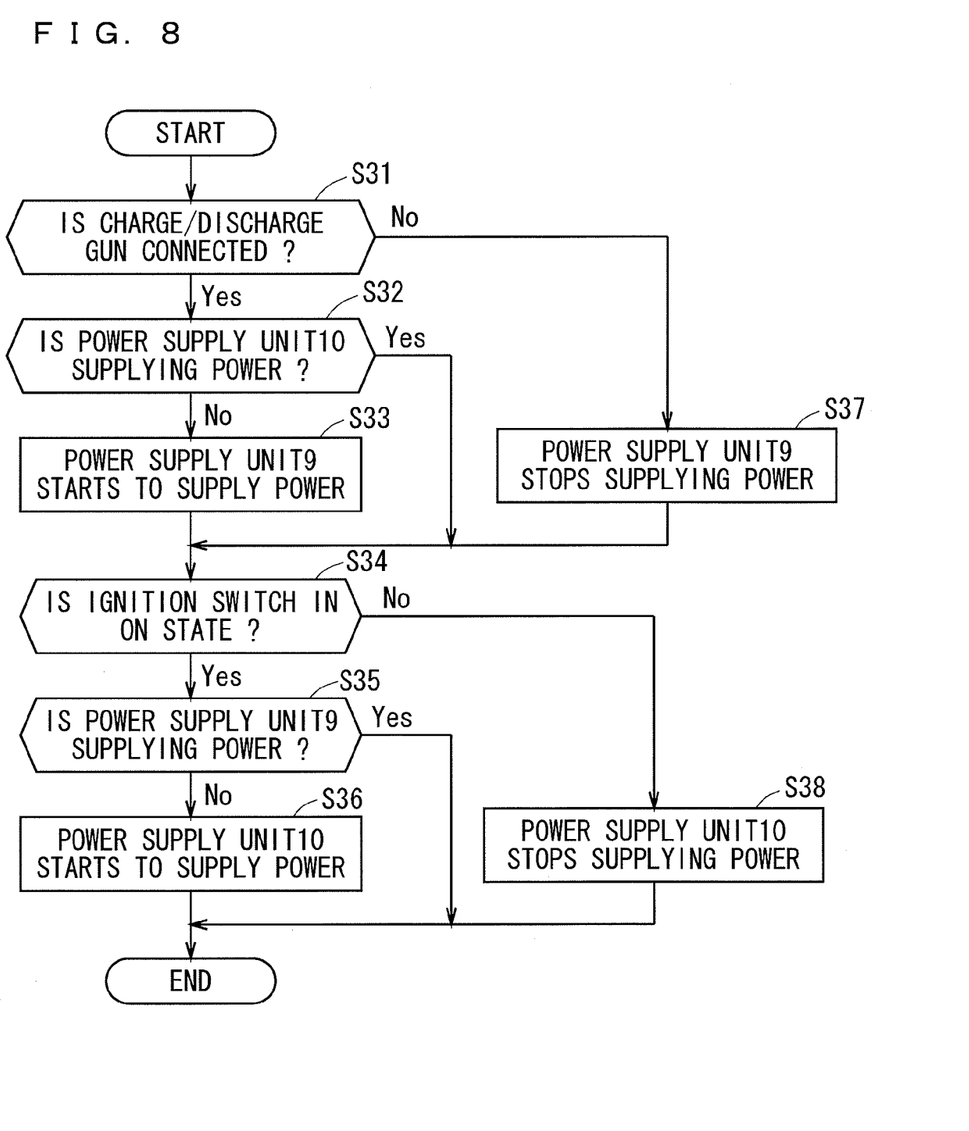
FIG. 8 is a flowchart for explanation of an operation of a power supply reconciliation unit for reconciling the power supply units.

Hereinafter, with reference to the flowchart of FIG. 8, discussion will be made on an operation of the power supply reconciliation unit 31 for reconciling the power supply units 9 and 10.

The power supply reconciliation unit 31 regularly checks whether or not a connection signal of the charge/discharge gun GN is outputted from the vehicle connection unit 3 and whether or not an ignition signal is outputted from the ignition switch 11. When it is determined that the charge/discharge gun GN is connected to the vehicle connection unit 3 in Step S31, the power supply reconciliation unit 31 checks whether or not the power supply unit 10 is supplying power to a predetermined unit (Step S32). Then, when it is determined that the power supply unit 10 is not supplying power in Step S32, the power supply reconciliation unit 31 controls the power supply unit 9 to start supplying power to the BMU 5 and the charge/discharge control unit 6 (Step S33) and the process goes to Step S34. When it is determined that the power supply unit 10 is supplying power in Step S32, the process goes to Step S34.

On the other hand, when it is determined that the charge/discharge gun GN is not connected to the vehicle connection unit 3 in Step S31, the power supply reconciliation unit 31 controls the power supply unit 9 to stop supplying power to the BMU 5 and the charge/discharge control unit 6 (Step S37) and the process goes to Step S34.

In Step S34, the power supply reconciliation unit 31 checks whether or not the ignition switch 11 is in an ON state (the ignition signal is given), and when it is determined that the ignition switch 11 is in the ON state, the power supply reconciliation unit 31 checks whether or not the power supply unit 9 is supplying power to a predetermined unit (Step S35). Then, when it is determined that the power supply unit 9 is not supplying power in Step S35, the power supply reconciliation unit 31 controls the power supply unit 10 to start supplying power to the BMU 5 and the drive motor control unit 8 (Step S36).

On the other hand, when it is determined that the ignition switch 11 is in the OFF state in Step S34, the power supply reconciliation unit 31 controls the power supply unit 10 to stop supplying power to the BMU 5 and the drive motor control unit 8 (Step S38).

Further, when it is determined that the power supply unit 9 is supplying power in Step S35, the power supply reconciliation unit 31 continues the charge/discharge.

<The Fourth Variation>

Though the case where start and end of the charge/discharge is determined with the connection and disconnection of the charge/discharge gun GN to/from the vehicle connection unit 3 as a trigger has been discussed in the above-discussed preferred embodiment, there may be a case where start and end of the charge/discharge is determined on the basis of a communication content between the electric vehicle and the equipments outside the vehicle, such as the smart grid charge/discharge-capable equipment 2 and the like.

Specifically, the power supply unit 9 may determine the start and end of the charge/discharge by receiving a control signal such as a charge start instruction, a charge current instruction, a charge end instruction, a discharge start instruction, a discharge current instruction, a discharge end instruction, or the like from the equipment outside the vehicle such as the smart grid charge/discharge-capable equipment 2 or the like. Further, a control over the charge current and the discharge current may be performed by also giving the control signal to the charge/discharge control unit 6.

With this configuration, it is possible to not only determine the start and end of the charge/discharge but also control the charge current and the discharge current.

<The Fifth Variation>

Though the configuration where no power is supplied to the drive motor control unit 8 during charging and discharging has been discussed in the above-discussed preferred embodiment, there may be a configuration where the electric power is once supplied to the portion (the charge/discharge control unit 6 and the BMU 5) from the smart grid charge/discharge-capable equipment 2 outside the vehicle to the battery 4 which is relevant to the charge/discharge and further supplied to the other portion (the drive motor control unit 8) before performing the charge/discharge to thereby perform an abnormality check of the high voltage wiring system in the electric vehicle.

With this configuration, it is possible to check if there is any abnormality in the whole system at the start-up of the vehicle (when the charge/discharge gun is connected or when the ignition switch is turned on) and further simplify the software since a common start-up sequence can be used both during running and during charging and discharging.

Figure 9:
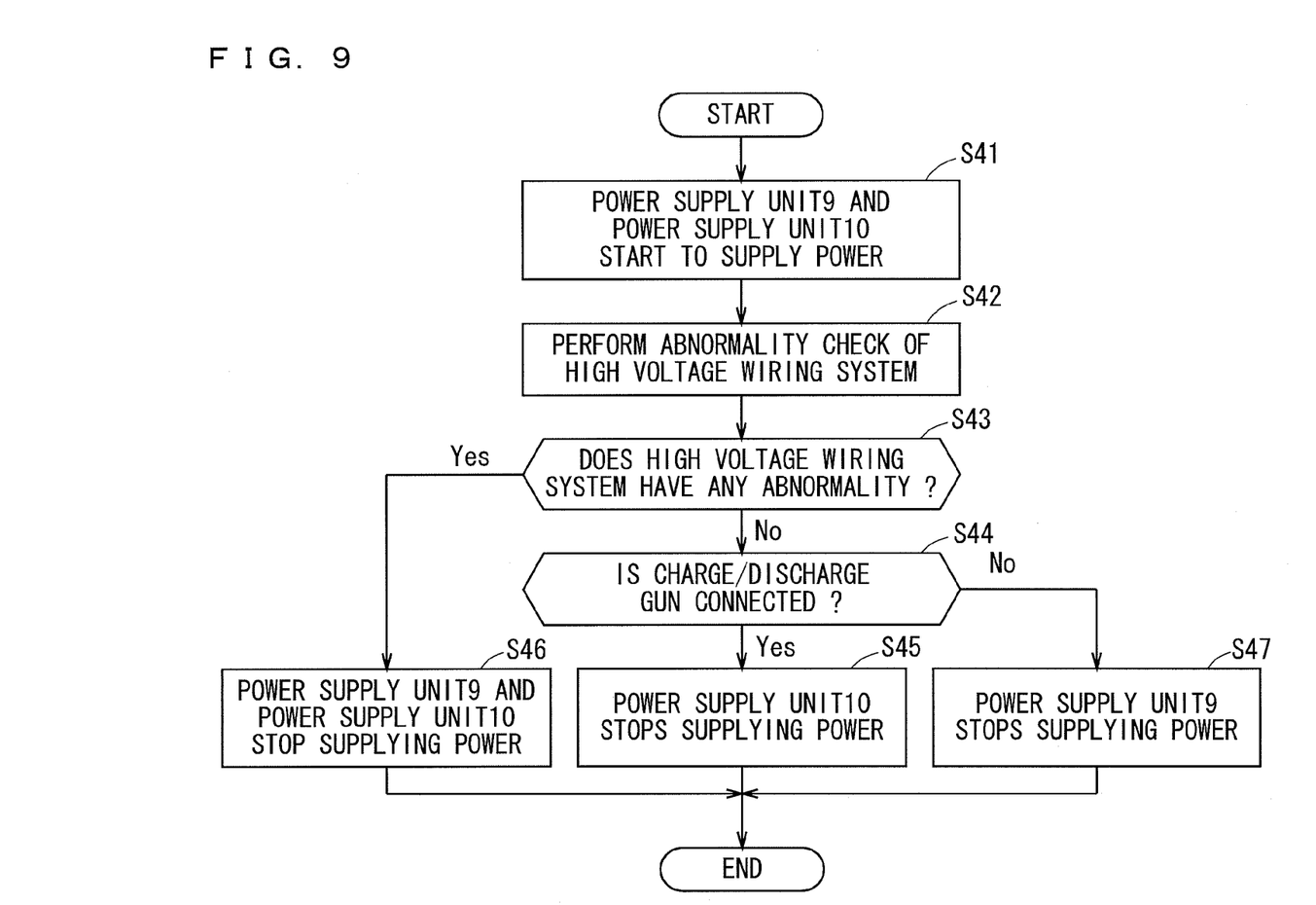
FIG. 9 is a flowchart for explanation of an operation for performing an abnormality check of the high voltage wiring system.

Hereinafter, with reference to the flowchart of FIG. 9, discussion will be made on an operation of performing an abnormality check of the high voltage wiring system.

When the power supply unit 9 detects that the charge/discharge gun GN is connected or when the power supply unit 10 detects that the ignition switch 11 is turned on, the power supply unit 9 starts to supply power to the BMU 5 and the charge/discharge control unit 6 and the power supply unit 10 starts to supply power to the BMU 5 and the drive motor control unit 8 (Step S41). The BMU 5 is configured to cut off one of the power supplies when the BMU 5 is supplied with power from both the power supply unit 9 and the power supply unit 10.

Then, the BMU 5, the charge/discharge control unit 6, and the drive motor control unit 8 which are activated perform an abnormality check of the high voltage wiring system (Step S42) and check if there is any abnormality in the high voltage wiring system (Step S43). Specifically, the BMU 5, the charge/discharge control unit 6, and the drive motor control unit 8 each perform an operation check thereof. Then, when some abnormality is found in the high voltage wiring system, the power supply units 9 and 10 stop supplying power (Step S46).

On the other hand, when no abnormality is found in the high voltage wiring system, the power supply unit 9 checks whether or not the charge/discharge gun GN is connected (Step S44), and when it is determined that the charge/discharge gun GN is connected, the power supply unit 10 stops supplying power (Step S45). In this configuration, the power supply units 9 and 10 share information (exchange information). Since the information that the charge/discharge gun GN is connected is given to the power supply unit 10, the power supply unit 10 can stop supplying power.

When it is determined that the charge/discharge gun GN is not connected in Step S44, since the ignition switch 11 is turned on, the power supply unit 9 stops supplying power (Step S47).

With this operation, after performing the abnormality check of the high voltage wiring system in the electric vehicle, when the electric vehicle starts running, the power supply of the charge/discharge control unit 6 which is unnecessary for running is cut off, and when the charge/discharge is performed, the power supply of the drive motor control unit 8 which is unnecessary for the charge/discharge is cut off.

<The Sixth Variation>

Though the charge/discharge system which performs both the charge to the battery 4 from the smart grid charge/discharge-capable equipment 2 and the discharge from the battery 4 to the smart grid charge/discharge-capable equipment 2 has been discussed in the above-discussed preferred embodiment, the present invention may be applied to a charge/discharge system which performs either one of the charge and the discharge.

The preferred embodiment may be modified or omitted as appropriate within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A charge/discharge system mounted on an electric vehicle using a motor as a driving source, which is driven by electric power charged in a battery, said charge/discharge system for controlling at least one of charge from an outside of said electric vehicle to said battery and discharge from said battery to said outside of said vehicle, the charge/discharge system comprising:
   a power supply unit for controlling a power supply to:
   supply power only to a unit contributing charge or discharge, among units connected to a wiring system for driving power for said motor, when charge or discharge to or from said battery from or to said outside of said vehicle is performed, wherein
   said power supply unit performs
   a first control operation to supply power to a drive motor control unit for controlling said motor and not to supply power to said unit contributing charge or discharge when said power supply unit receives an ignition signal which is outputted from an ignition switch in an ON state, which is used for causing said electric vehicle to start running,
   a second control operation not to supply power to said drive motor control unit if said power supply unit receives an ignition signal when a dedicated cable used for charge or discharge to or from said battery from or to said outside of said vehicle is connected to said electric vehicle and said ignition switch is turned on, and
   a third control operation to stop supplying power to said unit contributing charge or discharge when power is supplied to said drive motor control unit and said dedicated cable is connected to said electric vehicle.

2. The charge/discharge system according to claim 1, wherein
   said power supply unit controls a start and end of said power supply based on a connection and disconnection of a dedicated cable to or from said electric vehicle, said dedicated cable used for charge or discharge to or from said battery from or to said outside of said vehicle.

3. A charge/discharge system mounted on an electric vehicle using a motor as a driving source, which is driven by electric power charged in a battery, said charge/discharge system for controlling at least one of charge from an outside of said electric vehicle to said battery and discharge from said battery to said outside of said vehicle, the charge/discharge system comprising:
   a power supply unit for controlling a power supply to:
   supply power only to a unit contributing charge or discharge, among units connected to a wiring system for driving power for said motor, when charge or discharge to or from said battery from or to said outside of said vehicle is performed, wherein
   said charge/discharge system further comprises:
   a charge/discharge control unit for controlling charge or discharge to or from said battery; and
   a battery management unit for monitoring a condition of said battery,
   wherein said power supply unit supplies power only to said charge/discharge control unit and said battery management unit when charge or discharge to or from said battery from or to said outside of said vehicle is performed,
   wherein said power supply unit once supplies power to said charge or discharge control unit, said battery management unit, and a drive motor control unit for controlling said motor when said power supply unit receives an ignition signal which is outputted from an ignition switch in an ON state, which is used for causing said electric vehicle to start running or when a dedicated cable used for charge or discharge to or from said battery from or to said outside of said vehicle is connected to said electric vehicle, and
   said charge/discharge control unit, said battery management unit, and said drive motor control unit perform an abnormality check of said wiring system.

4. The charge/discharge system according to claim 3, wherein
   said power supply unit controls a start and end of said power supply on the basis of a control signal transmitted from said outside of said vehicle through a dedicated cable used for charge or discharge to or from said battery from or to said outside of said vehicle.

5. A charge/discharge system mounted on an electric vehicle using a motor as a driving source, which is driven by electric power charged in a battery, said charge/discharge system for controlling at least one of charge from an outside of said electric vehicle to said battery and discharge from said battery to said outside of said vehicle, the charge/discharge system comprising:
   a power supply unit for controlling a power supply to:
   supply power only to a unit contributing charge or discharge, among units connected to a wiring system for driving power for said motor, when charge or discharge to or from said battery from or to said outside of said vehicle is performed, wherein
   said charge/discharge system further comprises:
   a charge/discharge control unit for controlling charge or discharge to or from said battery; and
   a battery management unit for monitoring a condition of said battery,
   wherein said power supply unit supplies power only to said charge/discharge control unit and said battery management unit when charge or discharge to or from said battery from or to said outside of said vehicle is performed, wherein said power supply unit once supplies power to said charge or discharge control unit, said battery management unit, and a drive motor control unit for controlling said motor when said power supply unit receives an ignition signal which is outputted from an ignition switch in an ON state, which is used for causing said electric vehicle to start running or when a dedicated cable used for charge or discharge to or from said battery from or to said outside of said vehicle is connected to said electric vehicle, and said charge/discharge control unit, said battery management unit, and said drive motor control unit perform an abnormality check of said wiring system, wherein said power supply unit controls a start and end of said power supply based on a connection and disconnection of the dedicated cable to or from said electric vehicle.

6. A charge/discharge system mounted on an electric vehicle using a motor as a driving source, which is driven by electric power charged in a battery, said charge/discharge system for controlling at least one of charge from an outside of said electric vehicle to said battery and discharge from said battery to said outside of said vehicle, the charge/discharge system comprising:

a power supply unit for controlling a power supply to:

supply power only to a unit contributing charge or discharge, among units connected to a wiring system for driving power for said motor, when charge or discharge to or from said battery from or to said outside of said vehicle is performed, wherein said power supply unit performs a first control operation to supply power to a drive motor control unit for controlling said motor and not to supply power to said unit contributing charge or discharge when said power supply unit receives an ignition signal which is outputted from an ignition switch in an ON state, which is used for causing said electric vehicle to start running, a second control operation not to supply power to said drive motor control unit if said power supply unit receives an ignition signal when a dedicated cable used for charge or discharge to or from said battery from or to said outside of said vehicle is connected to said electric vehicle and said ignition switch is turned on, and a third control operation to stop supplying power to said unit contributing charge or discharge when power is supplied to said drive motor control unit and said dedicated cable is connected to said electric vehicle, wherein said power supply unit controls a start and end of said power supply on the basis of a control signal transmitted from said outside of said vehicle through the dedicated cable.

* * * * *